UNITED STATES PATENT OFFICE.

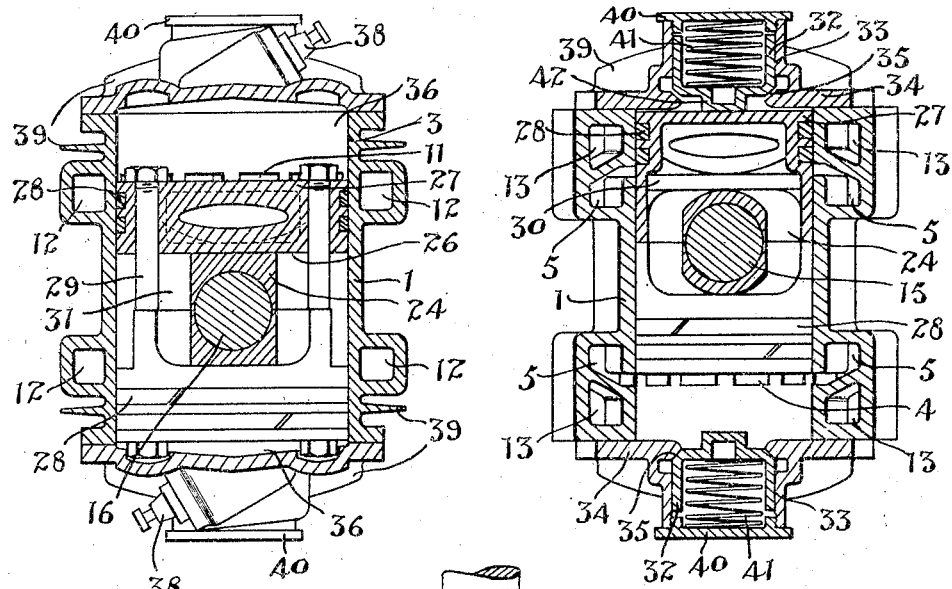
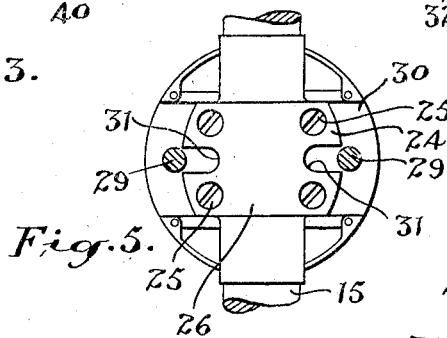
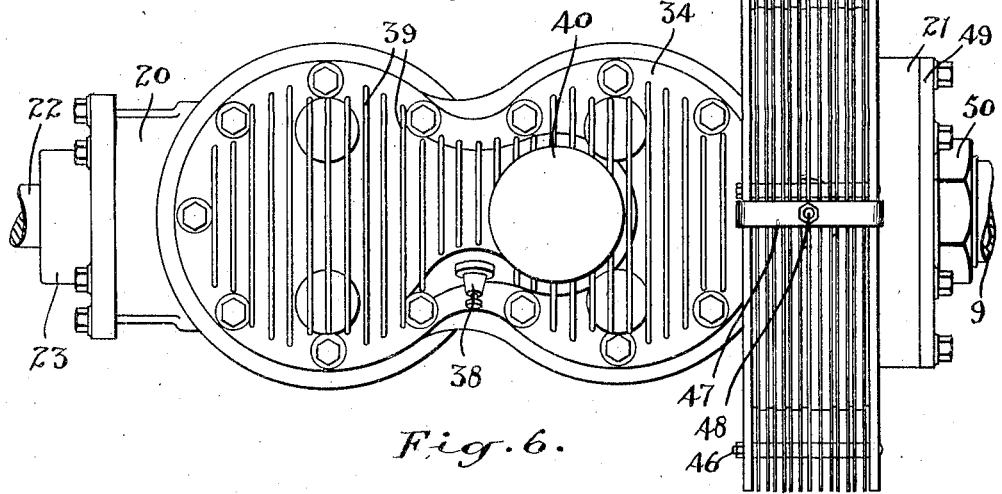

HENRY L. ROGERS, OF TORONTO, ONTARIO, CANADA.

INTERNAL-COMBUSTION ENGINE.

1,362,541.  Specification of Letters Patent.  Patented Dec. 14, 1920.

Application filed March 10, 1917. Serial No. 153,953.

*To all whom it may concern:*

Be it known that I, HENRY L. ROGERS, a subject of the King of Great Britain, and resident of the city of Toronto, county of York, Province of Ontario, in the Dominion of Canada, have invented certain new and useful Improvements in Internal-Combustion Engines, described in the following specification and illustrated in the accompanying drawings, that form part of the same.

The principal object of the invention is, to increase the efficiency of the two stroke cycle internal combustion engine enabling its effective operation at both high and low speeds.

A further important object is to produce a highly efficient engine at low cost and to eliminate the difficulties and cost in construction and maintenance incident to the use of intermittently operating valves and their operating mechanism.

A further object is to devise a construction of engine which is particularly adaptable for a rotary cylinder type and which may be effectively air cooled.

The principal feature of the invention consists in the novel construction and arrangement of parts whereby a rapid suction of combustible fluid is effected at slow or high speeds by the use of a pump cylinder which discharges directly into an adjacent power cylinder and whereby the operating parts are diametrically opposed to produce a balancing effect.

A further and important feature of the present invention consists in eliminating the use of connecting rods between the pistons and crank shaft and closely coupling the pistons directly to the crank pins.

In the present forms of internal combustion engines the development has been directed to obtaining the maximum throw or piston stroke in order to utilize the expansive power of the exploding gas to its utmost. This feature of construction may be utilized in connection with the arrangement of pump and explosion cylinders herein described but the preferable construction is shown in the accompanying drawings wherein the cylinder volume is distributed in a comparatively large diameter of cylinder with a short piston stroke in order to reduce the piston speed and to eliminate lateral thrust against the cylinder walls and other mechanical difficulties due to the use of connecting rods. The accompanying drawings illustrate a form of engine in which the cylinders rotate around a fixed crank shaft but it must be understood that the principle of operation may be as readily applied to an engine in which the cylinders are held stationary and the crank shaft revolves.

In the accompanying drawings, Figure 1 is a longitudinal sectional view taken perpendicularly through the cylinders of an engine constructed in accordance with this invention.

Fig. 3 is a vertical sectional view taken through the line *b—b* of Fig. 1, one of the pistons being shown in full lines and the other being shown in section.

Fig. 4 is a vertical sectional view taken through the line *c—c* of Fig. 1.

Fig. 5 is a plan view of the outer end of the block for connecting the piston with the crank.

Fig. 6 is a plan view of the engine showing the top of the cylinder heads.

Figure 1:
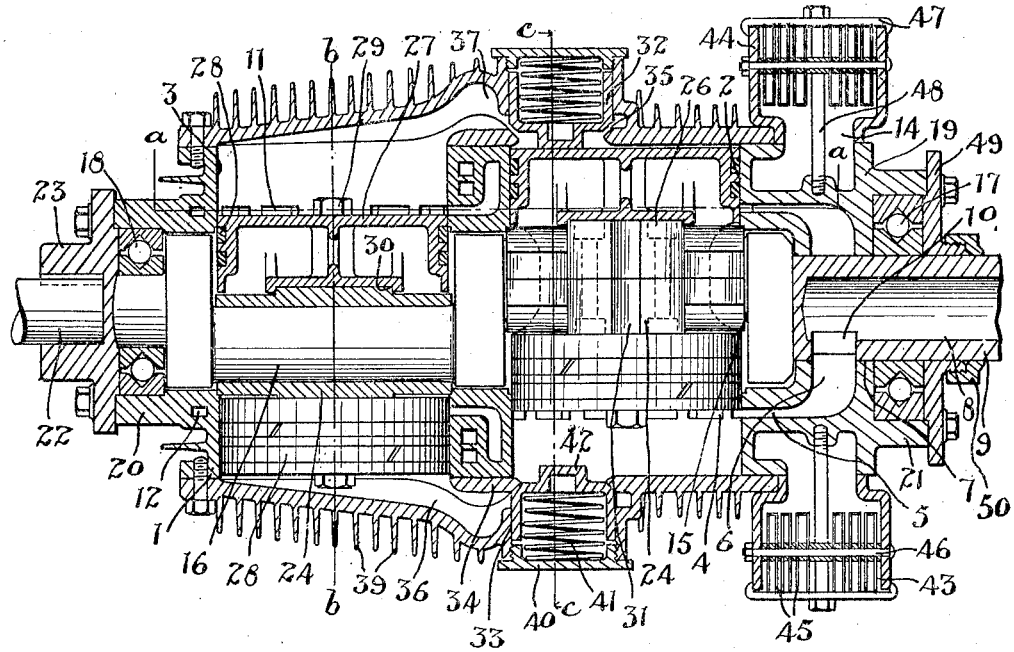
Figure 2:
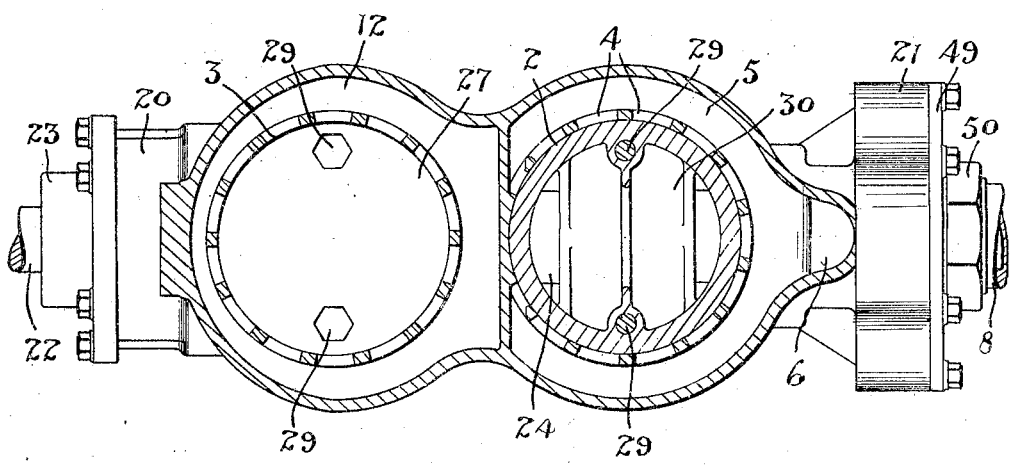
Fig. 2 is a horizontal sectional view taken through the line *a—a* of Fig. 1.

Referring to the drawings the main cylinder casting 1 is formed with the cylinders 2 and 3 parallelly arranged and extending transversely through the casting.

The pump cylinder 2 forms the inlet for the combustible mixture to be supplied to the power cylinder 3. The cylinder 2 is formed with a circumferential row of radial ports 4 arranged adjacent to each end and extending outwardly and communicating with surrounding passages 5 formed in the cylinder casting, said passages each having an inlet passage 6 opening to the cylindrical bore 7 through which the hollow end 8 of the crank shaft 9 extends. A port 10 is formed in the hollow shaft 8 adapted to register in rotation with the passage 6.

The cylinder 3 is formed with a circumferential row of radial ports 11, arranged adjacent to each end and communicating with annular passages 12 which connect with annular passages 13 encircling the ends of the cylinder 2 at the outward side of the inlet passages 5. The exhaust passages 13 communicate with an annular exhaust passage 14 which encircles the intake end of the cylinder casting and opens outwardly through the wall of the cylinder casting 1. The crank shaft 9 is formed with the crank pins 15 and 16 arranged respectively in the cylinders 2 and 3 and is surrounded by the ball bearings 17 and 18 arranged within the cylindrical extensions 19 and 20 of the cylinder casting.

A flanged head 21 is rigidly secured, preferably by an air tight joint, to the end 19 of the cylinder casting and in an engine in which the cylinders rotate the power transmission shaft 22 is secured within the extension 23 and rotates with the cylinder casting, the shaft being supported in a suitable bearing not shown. The crank shaft which is here described is intended to be held rigidly while the cylinder casting rotates upon the ball bearing supports.

24 are blocks encircling the crank pins 15 and 16 of the crank shaft, being formed in half sections secured together by the cap screws 25 suitably embedded. The blocks 24 are formed with the flat bearing surfaces 26 on the outward ends.

27 are piston heads adapted to operate within the cylinders 2 and 3 having suitable piston rings 28 engaging the side walls of the cylinder. The heads 27 are arranged in pairs one at each end of the center blocks 24 and are secured together by means of the bolts 29. The inner ends of the pistons are formed with transverse guides 30 in the form of slideways in which the flat surfaces 26 of the center blocks are adapted to slide. These bolts 29 extend through longitudinal slots 31 in the blocks 24 so that the piston heads may slide back and forth upon the blocks as the cylinders rotate or in the event of the cylinders being held stationary the blocks may slide transversely between the cylinder heads as the crank shaft rotates.

The construction of pistons and their connection to the crank shaft as herein described is unique and eliminates many engineering difficulties met with in connecting rod construction. It will be readily seen that the angular thrust of the piston is obviated. It will be noted that the pistons have a lateral sliding movement in relation to the crank bearing in a rotary cylinder engine and that in a rotary shaft engine the crank blocks slide laterally in the pistons. Consequently the stresses due to this lateral reciprocation are received by the cylinder walls and the crank shaft and bearings are relieved from such stresses.

The construction shown and described necessitates the use of a short throw crank and the pistons are preferably made proportionately large in diameter so as to obtain the desirable expansion volume for the explosive fluid. The short crank insures low piston speed which is extremely desirable obviating much friction loss and assisting lubrication.

This close coupling is also very important to a rotary type of engine as the parts are retained close in to the center and objectional centrifugal action is obviated.

The pump or compression cylinders 2 are provided with outlet valves 32 which are of cylindrical form and are slidably arranged in the cylindrical openings 33 in the cylinder heads 34. The heads 34 extend from end to end of the cylinder casting, each covering a corresponding pump and explosion cylinder and the outlet openings 35 closed by the valves 32 discharging directly into the explosion chambers 36 of the cylinders 3. Pockets 37 are arranged in the heads adjacent to the openings 35 from the pump cylinder and the spark plugs 38 are arranged therein so that the fresh gas is directed into contact therewith in such a manner as to insure the plug being surrounded by a clean explosive mixture.

Suitable radiating ribs 39 are formed upon the heads 34 and also upon the sides of the cylinder walls where the construction will allow, in order to quickly dissipate the heat of compression and explosion.

The cylindrical openings 33 in which the valves 32 are arranged are closed at the outer ends by suitable screw plugs 40 to allow of ready access to the valves. The valves are spring held to their seats by coil springs 41 inclosed between the valve and the cap. Each of the valves is formed with an inward projection 42 adapted to engage the pump piston at a period coinciding with the opening of the exhaust ports in the power cylinder. It will be noted that the pressure of explosion does not act against the valves 32 owing to the peculiar inclosed construction and arrangement thereof.

Upon the rotation of the cylinder casing or upon the rotation of the shaft within the cylinder casing, as the case may be, the inlet port 10 in the shaft 8 is brought into register with the openings in the cylinder casing at a period just prior to the clearance of the ports 4 by the piston head operating in the cylinder as is illustrated in the lower section of the cylinder 2 in Fig. 1 of the drawings. The suction created within the pump cylinder draws in a charge of combustible fluid and the ports are then closed by the return movement of the piston head and the charge is slightly compressed prior to the piston head engaging the inward projection 42 of the outlet valves 32. This arrangement insures a positive quick suction effect at slow speeds. Upon the lifting of the outlet valve from its seat the piston forces the charge of combustible fluid into the combustion chamber and the opening of the valve is timed to occur coincident with the uncovering of the exhaust ports 11 in the cylinder 3 and the inflowing charge is directed across the top of the power cylinder effectively scavenging it while the exhaust ports are open. The exhaust ports are then closed by the movement of the piston head in an outward direction and the charge of explosive mixture is compressed and at the proper period is ignited by the spark plug.

It will be noted that the valves 32 project into the cylinder head in such a manner that the gases of combustion do not have access to the outer end, consequently the opening of same is effected without loss of power and knocking will also be avoided.

It will be seen that by a construction such as described two power strokes occur for each revolution of the cylinder or for each revolution of the crank shaft and the impulse given is from a large diameter piston for a short stroke, thereby allowing proper expansion for a short stroke resulting in slow piston speed which will allow high engine speed. Upon the opening of the exhaust ports the gases flow through the annular passages 12 surrounding the power cylinders to the passages 13 arranged adjacent to the intake passages and pass through the annular passage 14. The heat of the exhaust is thus conveyed to the inflowing combustible mixture so as to raise its temperature considerably before it enters the cylinder, thus imparting to the mixture a highly desirable condition of temperature.

In order to reduce the pressure of the escaping exhaust gases I provide an annular muffler 43 to discharge the gases from the passage 14. The muffler is formed by a pair of rings 44 encircling the cylinder casting and arranged one at each side of the passage 14, said rings being preferably offset outwardly to provide a larger space to allow adequate expansion of the exhaust gases. Between the rings 44 are supported a plurality of annular plates 45 which are of thin sheet metal formed U-shaped in cross section and held in position by the bolts 46 and cross bridges 47 which span the outer edges of the rings 44. The adjacent faces of the annular plates are set apart a very short distance to form annular exhaust passages and the U-shape of the rings allows a circulation of air against an extensive area of the thin radiating plates which reduces the temperature and pressure rapidly. The muffler is held in place by bolts 48 extending through the bridges 47 and secured in the cylinder casting.

A plate 49 is secured to the outer end of the flange surrounding the ball bearings 17 and a suitable packing nut 50 encircles the hollow shaft 8 and is secured to said plate, thus preventing any leakage of air around the shaft. The entire engine casing is therefore air and oil tight.

In an engine constructed as described, when the cylinders rotate or are held stationary the operation of the piston is short and sharp and though the crank throw is short the area of pressure is large and owing to the low piston speed very high speeds of rotation may be obtained. The crank pin blocks slide back and forth between the piston head sections in a manner similar to a cross head and a considerable bearing area is presented for the pistons in said guides. It will be noted that when the pressure of an explosion occurs in one cylinder the effect is partly counteracted by the compression in the opposite one and an important feature of this arrangement is that compression is effected directly by the power piston without the intervention of any bearing stress either through the crank shaft or the piston walls. Further the operation of the pump piston is opposite to that of the power piston and a uniform center of gravity is maintained.

Effective lubrication may be effected by pressure means through the crank shaft as all operating parts are grouped very closely around the crank shaft.

An important feature of this device is that the operating gases have very short travel, the intake ports of the pump cylinder are close to the inlet and the passage is heated almost the entire distance by the exhaust gases, and the gas is forced directly into the combustion cylinder in a definite quantity at each stroke of the piston.

A very light, compact and simple form of engine is thus produced and the wearing stresses and adjustable parts are reduced to the minimum and high speeds are easily attained.

What I claim as my invention is:—

1. An internal combustion engine, comprising, a unitary casting having parallelly arranged cylinders forming respectively a power and pump cylinder, said cylinders opening at both ends and having ports through the side walls, the ports of the pump cylinder communicating with an annular inlet passage opening inwardly to a central opening and the ports from the power cylinder leading to an annular passage surrounding the pump cylinder adjacent to the intake passage and communicating with an annular exhaust opening outwardly, unitary cylinder heads closing the ends of said pump and power cylinders, double ended pistons operating in said cylinders, and a crank shaft journaled in said casing and having their crank pins connected midway of the length of said pistons, one end of said crank shaft having an opening leading to the intake to the pump cylinder.

2. An internal combustion engine, comprising, a unitary cylinder casing having a pair of transversely arranged cylinders the length of which is substantially the same as the bore, one forming a pump cylinder and the other a power cylinder each having ports in the side walls communicating with annular intake and exhaust passages respectively, journal bearings centrally located in respect to the width and depth of the cylinder casing in alinement with the longitudinal center of the casing and extending transversely of the cylinders, a crank shaft extending through the cylinders and supported in said bearings, and double ended pistons operatively connected to said crank shaft within said cylinders.

3. An internal combustion engine, comprising, a unitary cylinder casing having a pair of parallelly arranged cylinders extending transversely thereof, the diameter of said cylinders being greater than half the length, a crank shaft journaled at the ends and extending through the side walls of said cylinders having cranks with a throw less than the radius of the cylinders, double ended unitary pistons mounted centrally upon said crank pins and operating in said cylinders, unitary heads closing the ends of the adjacent power and pump cylinders, and intake and exhaust ports arranged in the cylinder walls adapted to be controlled by the movement of the piston heads.

4. An internal combustion engine, comprising, a cylinder casing having a power cylinder and a pump cylinder arranged transversely thereof, said power cylinder having a circumferential row of ports arranged adjacent to each end and communicating with an annular exhaust passage opening through the side of said casing, said pump cylinder having an annular row of ports arranged adjacent to each end and communicating with an annular inlet passage, an annular muffler encircling said casing and communicating with said exhaust, pistons operating in said cylinders in opposed relation, and means for closing the passage between the pump cylinder and the power cylinder.

5. An internal combustion engine, comprising, a cylinder casing having transversely arranged power and pump cylinders, each formed with a circumferential row of radial ports opening into annular passages, the annular passage communicating with the ports from the power cylinder leading to an annular exhaust passage arranged adjacent to the annular inlet passage to the pump cylinder, heads closing said cylinders having outlet passages from the pump cylinder opening directly into the combustion chamber of the power cylinder, and valves closing said discharge openings adapted to be opened by the pump piston.

H. L. ROGERS.